United States Patent
Hirose

(10) Patent No.: US 6,533,852 B2
(45) Date of Patent: Mar. 18, 2003

(54) RECORDING INK, METHOD FOR INK JET RECORDING, METHOD FOR PRODUCING COLOR FILTER, COLOR FILTER, METHOD FOR PRODUCING LIQUID CRYSTAL DISPLAY PANEL, LIQUID CRYSTAL DISPLAY PANEL, AND YELLOW INK

(75) Inventor: Masashi Hirose, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 81 days.

(21) Appl. No.: 09/770,507

(22) Filed: Jan. 29, 2001

(65) Prior Publication Data
US 2002/0046681 A1 Apr. 25, 2002

(30) Foreign Application Priority Data
Jan. 31, 2000 (JP) ......................... 2000-022428

(51) Int. Cl.$^7$ ..................... C09D 11/02; G02F 1/1335
(52) U.S. Cl. ................. 106/31.48; 106/31.49; 349/106
(58) Field of Search ............. 106/31.48, 31.49; 347/100; 430/7; 439/106

(56) References Cited

U.S. PATENT DOCUMENTS

| | | | | |
|---|---|---|---|---|
| 5,006,128 A | * | 4/1991 | Pedrazzi | 106/31.03 |
| 5,413,630 A | * | 5/1995 | Schwarz et al. | 106/31.48 |
| 5,929,218 A | * | 7/1999 | Lee et al. | 106/31.48 |
| 6,063,174 A | * | 5/2000 | Shirota et al. | 106/31.27 |
| 6,084,006 A | | 7/2000 | Kashiwazaki et al. | 523/160 |
| 6,162,510 A | | 12/2000 | Kashiwazaki et al. | 427/511 |
| 6,203,604 B1 | | 3/2001 | Kashiwazaki et al. | 106/31.5 |
| 6,248,482 B1 | * | 6/2001 | Kashiwazaki et al. | 106/31.5 |
| 6,303,763 B1 | * | 10/2001 | Meyrick et al. | 106/31.45 |

FOREIGN PATENT DOCUMENTS

| | | |
|---|---|---|
| JP | 59-75205 | 4/1984 |
| JP | 63-235901 | 9/1988 |
| JP | 1-217302 | 8/1989 |
| JP | 4-123005 | 4/1992 |

* cited by examiner

Primary Examiner—Helene Klemanski
(74) Attorney, Agent, or Firm—Fitzpatrick, Cella, Harper & Scinto

(57) ABSTRACT

A recording ink includes at least a water-soluble azopyridone dye of the following formula (1) and a water-soluble organic solvent:

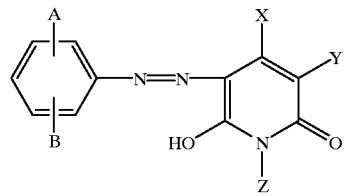

(1)

This ink has good heat resistance and light resistance and is suitable for producing color filters by using an ink jet system. The use of the ink provides a color filter that is satisfactory in washing resistance and adhesion to substrates and exhibits less blurring in portions colored with green pixels and has good color contrast and color purity. The invention also provides a production method of the color filter, a liquid crystal display panel using the color filter, a production method thereof, as well as a yellow ink that is particularly suitable for forming yellow images observed through a transmitted light.

29 Claims, 4 Drawing Sheets

LIGHT/HEAT

RECORDING INK, METHOD FOR INK JET RECORDING, METHOD FOR PRODUCING COLOR FILTER, COLOR FILTER, METHOD FOR PRODUCING LIQUID CRYSTAL DISPLAY PANEL, LIQUID CRYSTAL DISPLAY PANEL, AND YELLOW INK

BACKGROUND OF THE INVENTION

1. Field of the Invention

The present invention relates to a recording ink, a method for ink jet recording, a method for producing a color filter, and a color filter, as well as a method for producing a liquid crystal display panel, a liquid crystal display panel, and a yellow ink.

2. Description of the Related Art

Color filters are important components of color liquid crystal displays, and the filters have a structure including a multiplicity of pixels composed of three primary colors, red (R), green (G), and blue (B), arrayed on a transparent substrate.

In recent years, the demand for liquid crystal displays and particularly color liquid crystal displays has increased with the growth of the personal computer market and especially the portable personal computer market. Consequently, strong demands have been made to reduce the cost of liquid crystal displays and particularly expensive color filters, as well as to provide higher-definition-and higher-quality displays, for further growth of the market. These demands are difficult to satisfy simultaneously. Particularly, the former demand on color filters, which occupy a major portion of the cost of products, has been rapidly increased.

Various methods have been attempted in order to achieve cost reductions while satisfying the characteristics required for color filters. No methods satisfying all of the required characteristics, however, have been proposed.

Representative methods for producing color filters will now be described below.

The most popular method is a staining process, in which an easily-stained water soluble polymer material as a staining material and a photosensitizer are applied on a transparent substrate, the coating film is subjected to photolithography to form a given pattern, and the substrate is dipped into a staining bath to form a colored pattern. These procedures are repeated three times to form R, G and B colored layers of a color filter.

The second most popular method is a pigment dispersion process which has taken the place of the staining process, recently. In this process, a photosensitive resin layer containing dispersed pigment is formed on a substrate, and is patterned to form a given pattern in monochrome. The procedures are repeated three times to form R, G and B colored layers of a color filter.

Another method, which is also popular, is an electrodeposition process, in which a transparent electrode pattern is formed on a substrate, and the substrate is dipped into an electrodeposition solution containing a pigment, a resin, and an electrolytic solution to electro-deposit a first color. The procedures are repeated three times to form R, G and B colored layers, followed by baking to yield a color filter.

Protective films are generally formed on the colored layers in each of the first, second, and third methods.

The fourth method is a printing process, which includes dispersing a pigment in a thermosetting resin and printing the dispersion. The procedures are repeated three times to form R, G and B color filter layers and the substrate is heated to cure the thermosetting resin to yield colored layers.

One of common problems of these processes is high production cost due to triplicated coloring or staining procedures that are unavoidable in order to form R, G and B colored layers. Further, such repeated procedures result in a decreased yield.

In the electrodeposition process, the shape of the formable pattern is limited, and thus a color filter prepared by this process is not applicable to thin film transistor (TFT) color liquid crystal displays in the current technology. The printing process is not suitable for fine pitch patterning due to inferior resolution and smoothness.

As described above, several methods are in use for producing color filters. Among them, the staining process using a dye as a coloring material is considered to be the most advantageous from the viewpoint of coloring properties of displays.

However, in the staining process, the substrate is dipped in the staining solution to form pixels, and dyes to which a receiving layer is resistant cannot be employed even though their colors (spectrum characteristics) are satisfactory. As a possible solution to this problem, an attempt has been generally made to introduce a ternary ammonium or other cationic group into the receiving layer when the dye in question is an anionic dye, to thereby improve the dyeing property of the dye. This attempt is intended to increase the number of types of dyes that can be employed. This process, however, invites problems such as variation in the color of the dye (spectrum shift) or decreased heat resistance.

When a staining solution including a plurality of dyes is employed for toning, the dyeing property of an individual dye does not always match that of the receiving layer, and the desired color cannot be reliably obtained. Actually, the color cannot be finely controlled and the types of dyes and materials to be used for the receiving layer are significantly limited.

In order to overcome these problems, methods for manufacturing color filters by means of ink jet systems are proposed in Japanese Patent Laid-Open Nos. 59-75205, 63-235901, 1-217302, and 4-123005. These processes are different from the above-described conventional processes. In these processes, coloring solutions (hereinafter referred to as inks) separately containing coloring matters of R, G and B are jetted out from respective nozzles directly onto a filter substrate, and the inks are dried on the filter substrate to form colored layers (pixels).

These processes require no dyeing process between the dye and the receiving layer as in the staining process, and require no means for improving the dyeing property of the receiving layer such as the introduction of cationic groups. Accordingly, the problems such as variation of color (spectrum shift) of the dye itself prior to and subsequent to dyeing and decreased heat resistance can be avoided. Even when an ink containing a plurality of dyes is employed for toning, the resulting color does not significantly differ from the expected color. According to these processes, the formation of the individual colored pixels of R, G and B can be performed at once, and moreover, less ink is used. Therefore, they have the effects of enhancing productivity to a great extent and reducing the cost.

However, in these conventional methods for producing color filters with an ink jet recording system, the dyes that are used are not always appropriate for the ink jet recording system, and the methods include a lot of uncertainty about matching between the material for the receiving layer and the dye, and the imaging conditions (e.g., the type of receiving layer, and the amount of dye jetted thereon) to be used with the ink jet system. Accordingly, there are the following renewed technical requirements to be satisfied, but no method satisfying all the following requirements has been proposed, and demands are still made for rapid establishment of a method for solving such problems.

(1) The colored portions should have a satisfactory adhesion to the color filter substrate.

(2) The colored portions should have a high color purity (for example, the B pixel should sufficiently shade light in G and R wavelength regions).

(3) The colored portions should exhibit less blurring.

(4) The colored portions should have a satisfactory heat resistance.

SUMMARY OF THE INVENTION

Under these circumstances, the present inventors made intensive investigations and found that an ink including an azopyridone dye having a specific structure, in combination with a phthalocyanine dye, can satisfy the above requirements at a high degree as an ink for forming a green pixel of a color filter, and that a yellow ink containing the azopyridone dye having the specific structure is particularly advantageously used as an ink for the formation of yellow images observed through a transmitted light. The present invention has been accomplished based on these findings and further investigations.

Accordingly, it is an object of the present invention to provide an ink which can satisfy the above requirements at a high degree, which requirements are desirable in the production of a color filter with the ink jet system.

It is another object of the present invention to provide a method for ink jet recording using the ink, a color filter having a green pixel formed from the ink, a method for producing the color filter, a liquid crystal display panel using the color filter, and a method for producing the liquid crystal display panel.

A further object of the present invention is to provide a yellow ink which can be advantageously used, for example, in the formation of a yellow image observed through a transmitted light.

The above objects can be achieved by the present invention described below.

Specifically, the present invention provides in one aspect a recording ink comprising at least a water-soluble azopyridone dye represented by the following formula (1), and a water-soluble organic solvent:

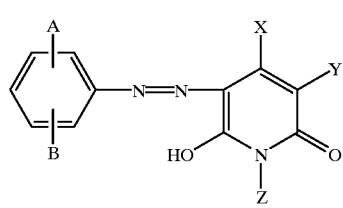

(1)

wherein each of A and B is independently a hydrogen atom, a halogen atom, a hydroxyl group, a cyano group, a nitro group, an amino group, a phosphono group, a sulfonyl group, a sulfamide group, a carboxyl group, a trifluoromethyl group, a straight-chain or branched alkyl group, a straight-chain or branched alkoxy group, an aryl group which may have at least one substituent, or a salt of these substances; X is a straight-chain or branched alkyl group, a hydrogen atom, a carboxyl group, or a trifluoromethyl group; Y is a hydrogen atom, a cyano group, a carbamoyl group, a sulfonyl group, a methylsulfonyl group, or a salt of these substances; and Z is a straight-chain or branched alkyl group, and wherein the water-soluble azopyridone dye has at least one sulfonyl group or a salt thereof in its structure.

In another aspect, the present invention provides a method for ink jet recording, which includes the step of performing ink jet recording with the use of the recording ink.

The present invention provides, in a further aspect, a method for producing a color filter, which includes the step of forming a plurality of colored pixels with the use of the recording ink.

In still another aspect, the present invention provides a method for producing a color filter with the use of the recording ink. This method comprises the steps of applying the ink to an ink receiving layer with an ink jet system, which ink receiving layer contains a polymer having an acrylic monomeric unit, and curing the ink receiving layer.

In a still further aspect, the present invention provides a method for producing a color filter, which comprises the steps of applying the recording ink to a substrate; and converting the applied ink on the substrate into a film to thereby form colored pixels, which recording ink further includes a film-forming component and is converted into a film with the application of heat or light or both after the application of the ink.

In another aspect, the present invention provides a color filter which is produced by the aforementioned method for producing a color filter.

The present invention provides, in still another aspect, a color filter containing a green pixel, and the green pixel comprises the water-soluble azopyridone dye represented by formula (1) and a phthalocyanine dye represented by the following formula (2):

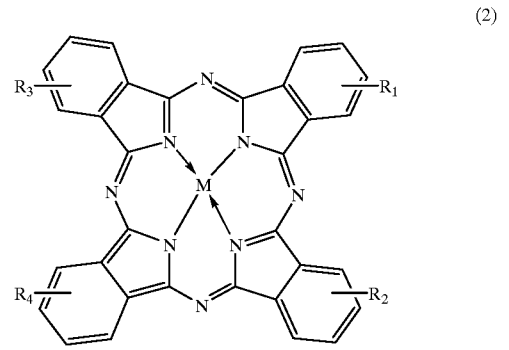

(2)

wherein each of $R_1$, $R_2$, $R_3$, and $R_4$ is independently a hydrogen atom, a sulfonyl group, a sulfamide group, a carboxyl group, a halogen atom, a hydroxyl group, a cyano group, a nitro group, an amino group, a phosphono group, a trifluoromethyl group, a straight-chain or branched alkyl group, a straight-chain or branched alkoxy group, an aryl group which may have a substituent, a phenoxy group which may have a substituent, a thiophenoxy group which may have a substituent, a phenyl group which may have a substituent, or a salt of these substances; M represents two hydrogen atoms, two Na atoms, two Li atoms, two metals, or a trivalent or tetravalent metal derivative, and wherein the phthalocyanine dye has at least two sulfonyl groups or salts thereof in its structure.

The present invention further provides a method for producing a liquid crystal display panel with the use of the aforementioned color filter.

In a yet further aspect, the present invention provides a liquid crystal display panel which includes the color filter.

In addition and advantageously, the present invention provides a yellow ink comprising the water-soluble azopyridone dye represented by the formula (1) and a water-soluble organic solvent.

The present invention can easily and economically provide satisfactory color filters.

In addition, the present invention can provide a liquid crystal panel having satisfactory characteristics by, for example, arranging a panel substrate facing the color filter produced by the invented production method, and encapsulating at least a liquid crystal composition into a gap between the filter and the panel substrate.

Further objects, features and advantages of the present invention will become apparent from the following description of the preferred embodiments with reference to the attached drawings.

DESCRIPTION OF THE PREFERRED EMBODIMENTS

Figure 1A:
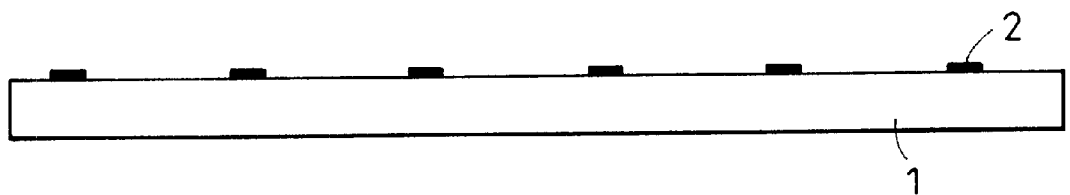
FIGS. 1A to 1E are process charts showing production procedures for a color filter as an embodiment of the present invention.

The present invention will be illustrated in further detail with reference to the preferred embodiments below.

Initially, the azopyridone dye represented by the following formula (1) will be described, which is a feature of the recording ink and the yellow ink of the present invention.

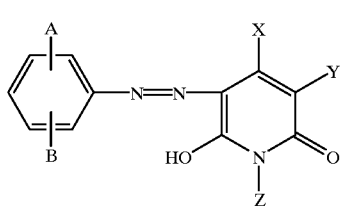

(1)

In the formula, each of A and B is independently a hydrogen atom, a halogen atom, a hydroxyl group, a cyano group, a nitro group, an amino group, a phosphono group, a sulfonyl group, a sulfamide group, a carboxyl group, a trifluoromethyl group, a straight-chain or branched alkyl group having, for example, 1 to 6 carbon atoms, a straight-chain or branched alkoxy group having, for example, 1 to 6 carbon atoms, an aryl group which may have at least one substituent, or a salt of these substances. Such substituents include, but are not limited to, halogen atoms, hydroxyl group, cyano group, nitro group, amino group, phosphono group, sulfonyl group, sulfamide group, carboxyl group, and trifluoromethyl group. X is a straight-chain or branched alkyl group having, for example, 1 to 3 carbon atoms, a hydrogen atom, a carboxyl group, or a trifluoromethyl group; Y is a hydrogen atom, a cyano group, a carbamoyl group, a sulfonyl group, a methylsulfonyl group, or a salt of these substances; and Z is a straight-chain or branched alkyl group having, for example, 1 to 6 carbon atoms. This compound has at least one sulfonyl group or a salt thereof in its structure.

To improve the light resistance and water resistance of a formed image, the dye should preferably have a trifluoromethyl group as X in the formula (1). In order to reduce water solubility due to the introduction of trifluoromethyl group, the dye should further preferably have a sulfonyl group, a methylsulfonyl group, or a salt of these substances as Y in the formula (1). Such coloring compounds (dyes) can be synthetically obtained by a conventionally known method described on page 403 of "Fine organic Synthesis 2nd Edition" (Nankodo Co., Ltd.). Alternatively, a desired azopyridone dye can be obtained by hydrolyzing the coloring compound in a conventional manner and subjecting the hydrolyzed coloring compound to sulfonation or another conventional procedure to thereby introduce a variety of functional groups into the compound.

Specifically, the azopyridone dyes for use in the invented recording ink include, but are not limited to, those having the following chemical formulae.

Chemical Formula 6

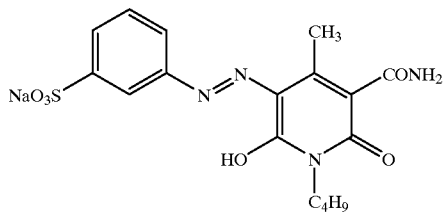

Chemical Formula 7

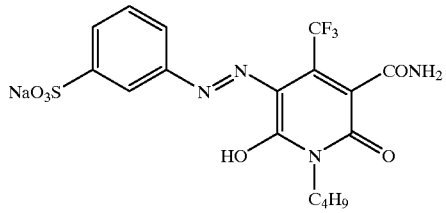

Chemical Formula 8

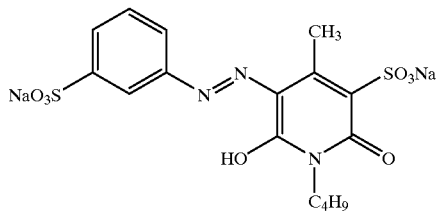

-continued

Chemical Formula 9

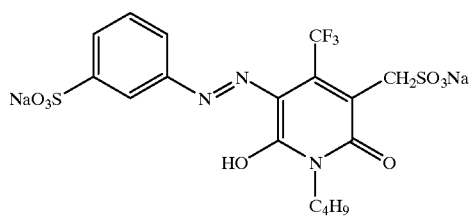

Chemical Formula 10

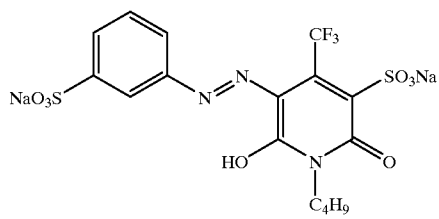

A yellow ink containing the azopyridone dye is typically useful for the formation of Y images observed through transmitted light.

In the invented recording ink for green color, a phthalocyanine dye may be used for color control of the azopyridone dye. Such phthalocyanine dyes include, for example, one represented by the following formula (2).

(2)

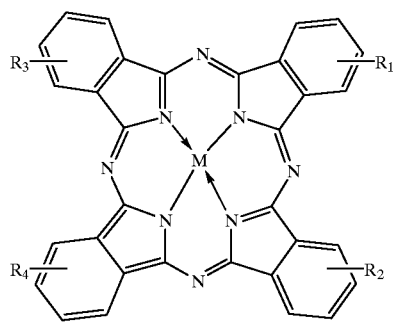

wherein each of $R_1$, $R_2$, $R_3$, and $R_4$ is independently a hydrogen atom, a sulfonyl group, a sulfamide group, a carboxyl group, a halogen atom, a hydroxyl group, a cyano group, a nitro group, an amino group, a phosphono group, a trifluoromethyl group, a straight-chain or branched alkyl group having, for example, 1 to 6 carbon atoms, a straight-chain or branched alkoxy group having, for example, 1 to 6 carbon atoms, an aryl group which may have a substituent, a phenoxy group which may have a substituent, a thiophenoxy group which may have a substituent, a phenyl group which may have a substituent, or a salt of these substances. Such substituents include, but are not limited to, sulfonyl group, sulfamide group, carboxyl group, halogen atoms, hydroxyl group, cyano group, nitro group, amino group, phosphono group, and trifluoromethyl group. M represents two hydrogen atoms, two Na atoms, two Li atoms, two metals, or a trivalent or tetravalent metal derivative. The phthalocyanine dye has at least two sulfonyl groups or salts thereof in its structure.

The phthalocyanine compound can be synthetically obtained by a conventionally known method described on page 418 of "Fine Organic Synthesis 2nd Edition" (Nankodo Co., Ltd.). By appropriately selecting a phthalonitrile to be used, phthalocyanine derivatives having a variety of functional groups can be obtained. In addition, a water-soluble phthalocyanine derivative can be obtained by treating the prepared phthalocyanine compound with, for example, a concentrated sulfuric acid, fuming sulfuric acid, or chlorosulfonic acid.

Specifically, such phthalocyanine dyes for use in the present invention include, but are not limited to, those having the following chemical formulae.

Chemical Formula 11

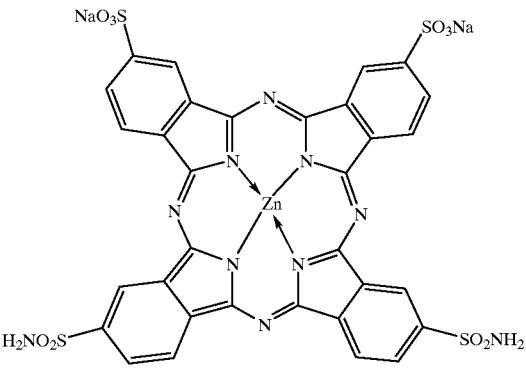

Chemical Formula 12

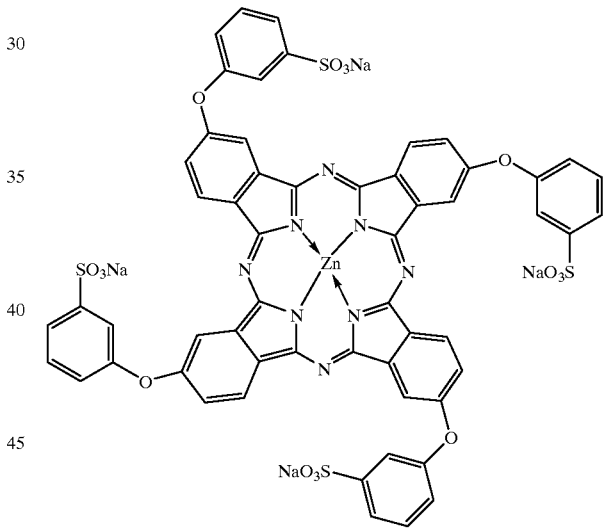

The total content of such dye compounds in the invented recording ink or yellow ink is 0.5 to 20% by weight, and preferably 1 to 15% by weight. The ink may further comprise dyes other than the above dyes and pigments, according to necessity. The recording ink prepared for green color should preferably include the water-soluble azopyridone dye and the phthalocyanine dye in a weight ratio of the former to the latter of 3:1 to 1:3. Within this range, the resulting color filter has green pixels exhibiting a more satisfactory green color and having a higher light resistance, as was found by the present inventors.

The invented recording ink and yellow ink each containing the dye may further comprise an organic solvent in order to improve, for example, stability in instruments for applying the ink, properties in ink application, and fixation property to recording media. Among such organic solvents, water-soluble organic solvents each having a boiling point of 120° C. or more are preferred.

Such preferred water-soluble organic solvents having a boiling point of 120° C. or more for use in the invented recording ink and yellow ink include, but are not limited to, dimethylformamide, dimethylacetamide, and other amides; polyethylene glycol, polypropylene glycol, and other polyalkylene glycols; diacetone alcohol, and other ketones or keto-alcohols; ethylene glycol, propylene glycol, butylene glycol, triethylene glycol, 1,2,6-hexanetriol, thiodiglycol, hexylene glycol, diethylene glycol, and other alkylene glycols each having two to six carbon atoms in the alkylene moiety; glycerol; ethylene glycol monomethyl (or monoethyl) ether, diethylene glycol methyl (or ethyl) ether, triethylene glycol monomethyl (or monoethyl) ether, and other lower alkyl ethers of polyhydric alcohols; N-methyl-2-pyrrolidone, 2-pyrrolidone, and 1,3-dimethyl-2-imidazolidinone. The content of the water-soluble organic solvent should be preferably 10% by weight or more based on the total weight of the ink.

The ink may comprise a water-soluble organic solvent having a boiling point of less than 120° C. in many cases. Such organic solvents include, but are not limited to, methyl alcohol, ethyl alcohol, n-propyl alcohol, isopropyl alcohol, n-butyl alcohol, sec-butyl alcohol, tert-butyl alcohol, and other alkyl alcohols each having 1 to 4 carbon atoms; acetone, and other ketones or keto-alcohols; tetrahydrofuran, dioxane, and other ethers; polyethylene glycol, polypropylene glycol, and other polyalkylene glycols; ethylene glycol, propylene glycol, butylene glycol, and 1,3-dimethyl-2-imidazolidinone.

The invented recording ink and yellow ink may further comprise nonionic, anionic, cationic, or other surfactants, as well as pH adjusting agents, fungicides, and other additives according to necessity.

Another embodiment of the invented recording ink includes at least a film-forming component in addition to the water-soluble azopyridone dye represented by the formula (1) and the water-soluble organic solvent, and can be converted into a film by the application of heat or light or both after the application of the ink. The recording ink comprising a film-forming component will be described below.

The film-forming components for use in the invented recording ink include components that are cured by the application of heat or light or both after the application of the ink. Such components include, but are not limited to, acrylic or vinyl monomers, and other monomeric components that are cured by a polymerization reaction induced by heat and/or light, and polymers or copolymers of these monomeric components that are cured by a dehydrating condensation reaction induced by heat and/or light. The recording ink should preferably comprise at least one polymerizable compound having an acrylic monomeric unit represented by the following formula (5) as the film-forming component. Specifically, each of the following monomers alone or in combination with another vinyl monomer that can form a copolymer with these monomers is preferably used.

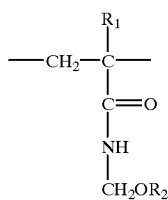

(5)

In the formula, $R_1$ is a hydrogen atom or a methyl group, and $R_2$ is a hydrogen atom or an alkyl group having, for example, 1 to 5 carbon atoms.

Such monomers include, but are not limited to, N-methylolacrylamide, N-methoxymethylacrylamide, N-ethoxymethylacrylamide, N-isopropoxymethylacrylamide, N-methylolmethacrylamide, N-methoxymethylmethacrylamide, N-ethoxymethylmethacrylamide, N,N-dimethylolacrylamide, N,N-dimethoxymethylacrylamide, N,N-diethoxymethylacrylamide, N,N-dimethylolmethacrylamide, N,N-dimethoxymethylmethacrylamide, and N,N-diethoxymethylmethacrylamide.

The other vinyl monomers include, but are not limited to, acrylic acid, methacrylic acid; methyl acrylate, ethyl acrylate, and other acrylic esters; methyl methacrylate, ethyl methacrylate, and other methacrylic esters; hydroxymethyl methacrylate, hydroxyethyl methacrylate, hydroxymethyl acrylate, hydroxyethyl acrylate, and other vinyl monomers each having a hydroxyl group; as well as styrene, α-methylstyrene, acrylamide, methacrylamide, acrylonitrile, allylamine, vinylamine, vinyl acetate, and vinyl propionate. The copolymerization ratio (% by weight) of the monomer to the other vinyl monomer is preferably 100:0 to 5:95, and more preferably 90:10 to 10:90.

The content of the film-forming component to be incorporated in the ink is preferably 0.01 to 30% by weight, and more preferably 0.1 to 10% by weight. When the ink is converted into a film with the use of light, the ink may further comprise various photo-curable resin components or photopolymerization initiators.

The invented recording ink also exhibits satisfactory performance in conventional recording techniques and can be used as an ink for implements for writing, and for other recording technique applications.

Next, the invented method for producing a color filter for use in, for example, liquid crystal displays (hereinafter simply referred to as "color filter for liquid crystals") will be described below. FIGS. 1A to 1E show a method for producing a color filter for liquid crystals according to the present invention.

FIG. 1A shows a substrate 1. A glass substrate is generally used as the substrate 1, but other substrates can be used as long as they have transparency and mechanical strength, which are essential characteristics for color filters for liquid crystals.

FIG. 1A shows the glass substrate 1 on which a black matrix 2 and a light-transmitting area 7 are formed. When the black matrix 2 is formed directly on the substrate, it can be prepared by forming a metallic thin film by sputtering or vapor deposition and patterning the film through a photolithographic process. When the black matrix 2 is formed on a resinous composition, it can be prepared by a conventional photolithographic patterning process. The present invention is not limited to these embodiments.

Figure 1B:
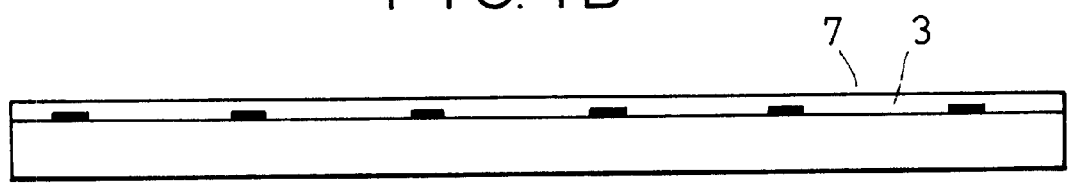

As shown in FIGS. 1A to 1E, an ink receiving layer 3 is initially formed on the substrate 1 by forming a layer containing a curable resin composition on the substrate 1 with the black matrix 2, and curing the resin composition (FIG. 1B).

The ink receiving layer 3 should comprise a polymer having at least one acrylic monomeric unit as a structural unit. The material for the ink receiving layer should preferably comprise at least a unit represented by the following formula (5), and the ink receiving layer preferably comprises a homopolymer of an acrylamide monomer corresponding to the structural unit, a copolymer of the monomer with another vinyl monomer, or a plurality of these polymers.

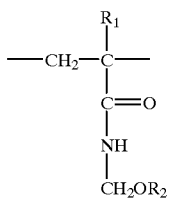

(5)

In the formula, $R_1$ is a hydrogen atom or a methyl group, and $R_2$ is a hydrogen atom or an alkyl group having, for example, 1 to 5 carbon atoms.

Such monomers corresponding to the structural units represented by formula (5) include, but are not limited to, N-methylolacrylamide, N-methoxymethylacrylamide, N-ethoxymethylacrylamide, N-isopropoxymethylacrylamide, N-methylolmethacrylamide, N-methoxymethylmethacrylamide, N-ethoxymethylmethacrylamide, N,N-dimethylolacrylamide, N,N-dimethoxymethylacrylamide, N,N-diethoxymethylacrylamide, N,N-dimethylolmethacrylamide, N,N-dimethoxymethylmethacrylamide, and N,N-diethoxymethylmethacrylamide.

The other vinyl monomers include, but are not limited to, acrylic acid, methacrylic acid; methyl acrylate, ethyl acrylate, and other acrylic esters; methyl methacrylate, ethyl methacrylate, and other methacrylic esters; hydroxymethyl methacrylate, hydroxyethyl methacrylate, hydroxymethyl acrylate, hydroxyethyl acrylate, and other vinyl monomers each having a hydroxyl group; as well as styrene, α-methylstyrene, acrylamide, methacrylamide, acrylonitrile, allylamine, vinylamine, vinyl acetate, and vinyl propionate. The copolymerization molar ratio of the monomer corresponding to the structural unit represented by formula (5) to the other vinyl monomer is preferably in a range from 95:5 to 5:95.

The ink receiving layer for use in the present invention may further comprise an additional polymeric compound in addition to the above-prepared homopolymer and/or copolymer. Such additional polymeric compounds include, but are not limited to, polyvinyl pyrrolidone, poly(vinyl alcohol), poly(vinyl acetal), polyurethanes, carboxymethylcellulose, polyesters, polyacrylic acid (or esters thereof), hydroxyethylcellulose, hydroxypropylcellulose, or modified products of these polymers, and other synthetic resins, as well as albumin, gelatin, casein, starch, cationated starch, gum arabic, sodium alginate, and other natural resins. These additional polymeric compounds should preferably occupy 70% by weight or less of the total weight of resins constituting the ink receiving layer.

The ink receiving layer 3 may further comprise a variety of additives according to necessity. Such additives include, but are not limited to, surfactants, dye-sticking agents (water-resistance improvers), defoaming agents, antioxidants, fluorescent whiteners, UV absorbents, dispersants, viscosity modifiers, pH adjusting agents, fungicides, and plasticizers. Each of these additives can be freely selected, depending on purpose, from known conventional compounds.

Figure 1C:
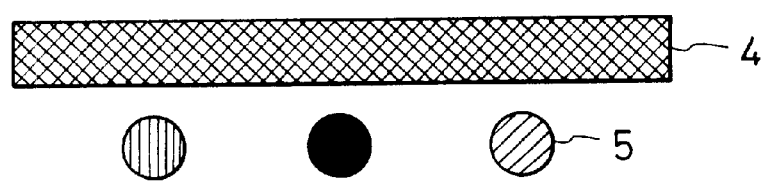
Figure 1C:
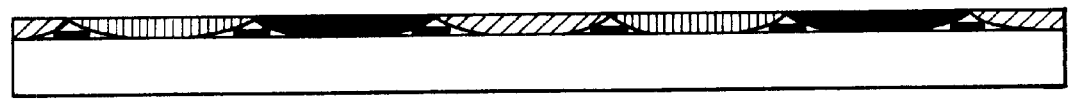
Figure 1D:
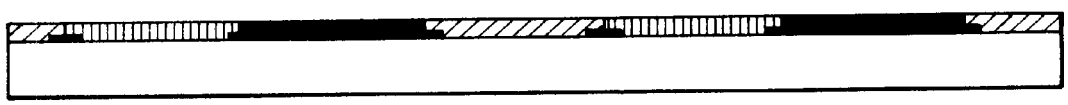

The ink receiving layer can be formed by spin coating, roller coating, bar coating, spray coating, dip coating, or another technique. The formed ink receiving layer is further pre-baked according to necessity and is colored by an ink jet recording system using R, G, or B colored inks 5, in which the G colored ink contains the aforementioned water-soluble azopyridone dye and other components (FIG. 1C). Regarding R and B colored inks, any commercially available dyes and pigments, in particular for ink-jet inks, can be employed. While liquid inks and solid inks can be employed as the inks, water-soluble inks can be very advantageously used in the invented method for producing a color filter.

FIG. 1C schematically illustrates an ink jet recording head 4 and individual ink droplets 5 of R, G, and B colors respectively. The ink jet recording system may employ an electrothermal transducer or a piezoelectric element as an energy-generating element. The area and pattern of coloring can be freely set.

Figure 1E:
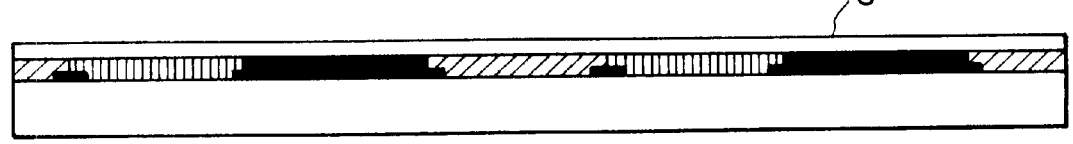

After coloring the ink receiving layer with individual color inks as above, the ink receiving layer 3 is subjected to light application or to light application and heat treatment in combination to cure the ink receiving layer 3 (FIG. 1D), and where necessary, a protective layer 6 is formed on the cured ink receiving layer 3 to thereby yield the invented color filter (FIG. 1E).

As described above, the preferred materials for the ink receiving layer for use in the present invention can comprise a photopolymerization initiator. In this case, areas not to be colored in the ink receiving layer corresponding to the black matrix preferably should be subjected to light irradiation or to light irradiation and heat treatment prior to the application of ink. By this procedure, ink absorbency of the treated areas can be reduced. The treatment of the ink receiving layer can effectively prevent problems due to color mixing between individual pixels or irregular color, which tend to occur in the formation of R, G, and B pixels by the use of an ink jet recording system. Accordingly, high-quality color filters can be produced at low cost.

Figure 2A:
FIGS. 2A to 2E are process charts showing production procedures for a color filter as another embodiment of the present invention.
Figure 2B:
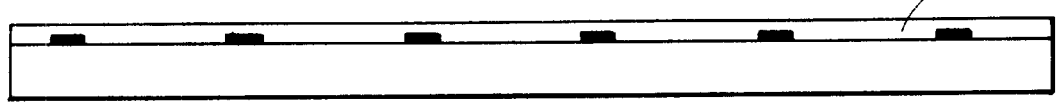
Figure 2C:
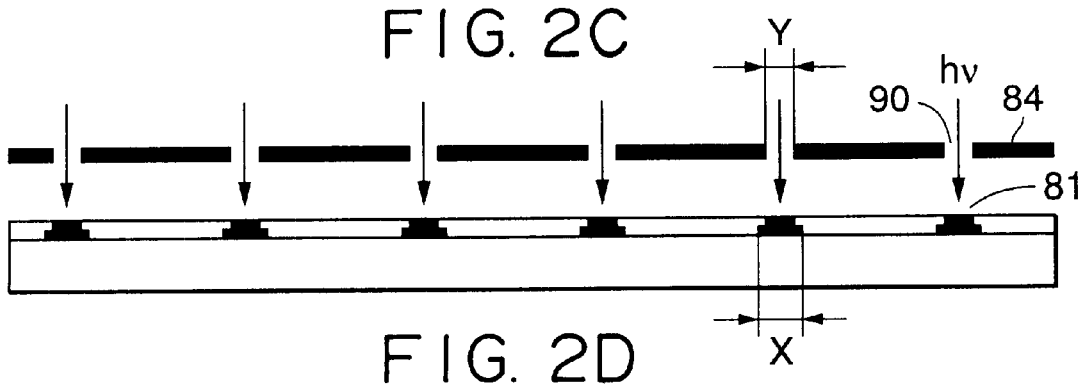
Figure 2D:
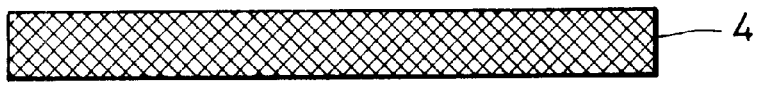
Figure 2D:
Figure 2D:
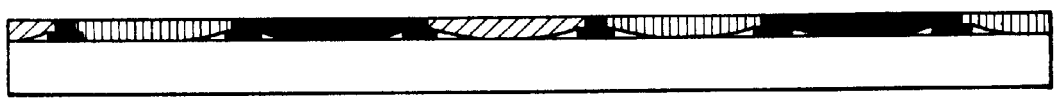
Figure 2E:
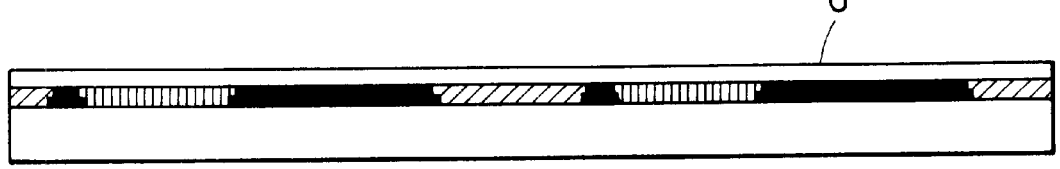

FIGS. 2A to 2E show the production procedures as mentioned above. Specifically, an ink receiving layer 3 containing a photopolymerization initiator is formed on a substrate 1 (FIGS. 2A and 2B). An area 81 not to be colored, corresponding to a black matrix 2, is then patterned by exposure to light through a photomask 84 (FIG. 2C) to thereby reduce the ink absorbency of the ink receiving layer 3.

The photomask 84 for use in patterning exposure should have an opening 90 which permits only the area 81 to be exposed, to thereby reduce the ink absorbency of the exposed area. In this case, a mask with an opening having a width Y slightly narrower than the width X of the black matrix is preferably employed, as larger amounts of ink must be ejected in order to prevent failure in coloring in the areas in contact with the black matrix 2. By this configuration, the area 81 that is not to be colored on the ink receiving layer 3 has a width narrower than that of the black matrix 2. The subsequent steps (FIGS. 2D and 2E) can be performed in the same manner as in the steps shown in FIGS. 1C through 1E to thereby yield a color filter.

In the above process, the ink receiving layer 3 can be irradiated with light by any means to thereby form the area (area not to be colored) 81 having a decreased ink absorbency. In the present invention, the use of deep UV rays is typically preferred, under irradiation conditions of about 1 to 3000 mJ/cm$^2$. The heat treatment can be performed at a temperature of 50° C. to 180° C. for 10 seconds to 20 minutes. The photopolymerization initiator will now be illustrated, which permits exposed areas of the ink receiving layer 3 to have a reduced ink absorbency through light irradiation.

Such photopolymerization initiators for use in the present invention preferably include, but are not limited to, onium salts and halogenated triazine compounds. Specifically, such onium salts include, but are not limited to, triphenylsulfonium hexafluoroantimonate, triphenylsulfonium tetrafluoroborate, triphenylsulfonium hexafluorophosphate, triphenylsulfonium trifluoromethylsulfonate, and derivatives of these onium salts, as well as diphenyliodonium hexafluoroantimonate, diphenyliodonium tetrafluoroborate, diphenyliodonium hexafluorophosphate, diphenyliodonium trifluoromethylsulfonate, and derivatives of these onium salts. Among these photopolymerization initiators, halogenated triazine compounds can be advantageously used. In addition, derivatives of these compounds can be used, but the photopolymerization initiators for use in the present invention are not limited to these compounds and derivatives thereof.

The amount of the photopolymerization initiator is preferably 0.01 to 20% by weight, and more preferably 0.1 to 10% by weight relative to the material of the ink receiving layer. The ink receiving layer may further comprise a sensitizer such as perylene, anthracene, and other compounds.

The method for producing a color filter with the use of the invented recording ink containing the film-forming component will be illustrated with reference to FIGS. 3A to 3D.

Figure 3A:
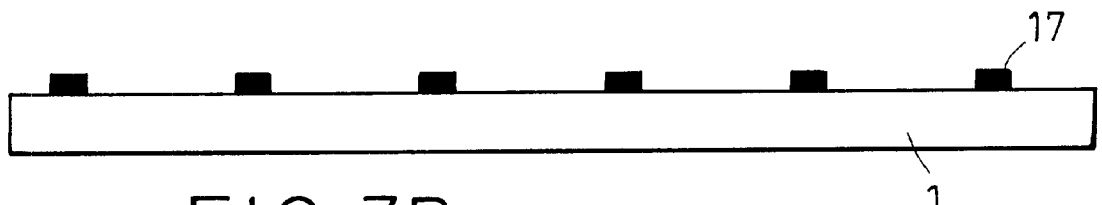
FIGS. 3A to 3D are process charts showing production procedures for a color filter as yet another embodiment of the present invention.

In this method, a substrate having an ink color mixing-preventing wall 17 is preferably used as a substrate 1, as shown in FIG. 3A. Specifically, the ink color mixing-preventing wall can be prepared by forming an ink-repellent matrix on an area of the substrate not to be colored. In the present invention, such an ink-repellent matrix can be formed on an area of the substrate not to be colored by, for example, a process which includes the steps of applying a transparent or black positive or negative photoresist to a transparent substrate or a substrate having a black matrix, which photoresist exhibits ink-repellency due to curing, and processing the applied substrate to thereby allow the resist pattern to remain on the area not to be colored. The use of a transparent photoresist in the process is expected to precisely form an ink-repellent wall on the substrate. Alternatively, the use of a black photoresist requires no additional black matrix and can shorten the process. In the use of an individual resist, an area (not shown) having ink repellency can be further formed on the resist layer.

Figure 3B:
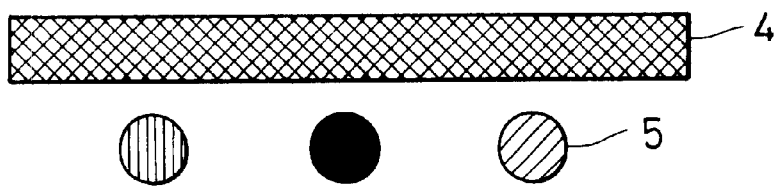
Figure 3B:
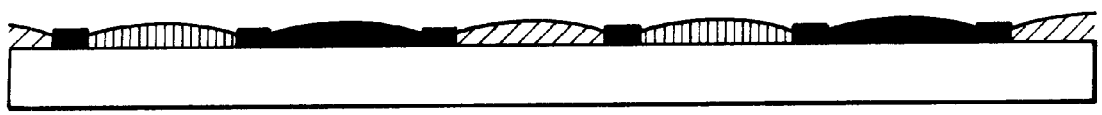
Figure 3C:
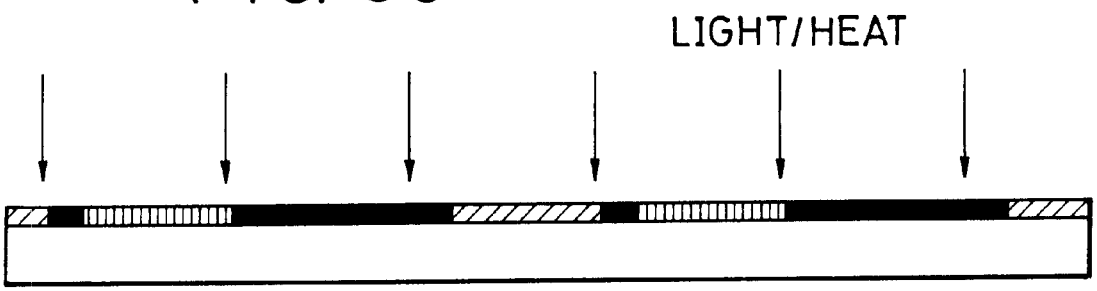

Next, recording inks of R, G, and B colors respectively containing the film-forming component are applied to areas of the substrate to be colored, using an ink jet head, and the applied inks are converted into films by the application of heat or light or both to form colored pixels (FIG. 3B). The ink of G color further comprises the aforementioned azopyridone dye. FIG. 3B schematically illustrates an ink jet head 4 and ink droplets 5 of R, G, and B colors. The ink jet recording system may employ an electrothermal transducer or a piezoelectric element as an energy-generating element. The area and pattern of coloring can be freely set.

Figure 3D:
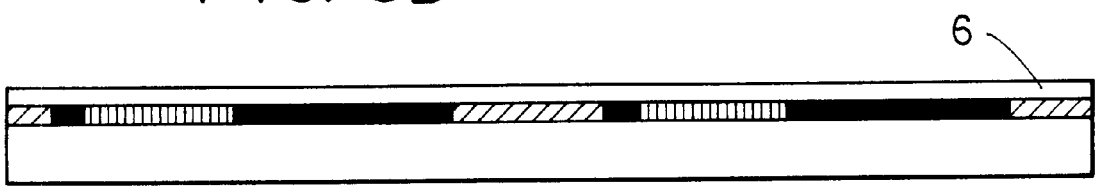

The inks applied on the substrate are then converted into a film by light irradiation or heat treatment or by light irradiation and heat treatment in combination (FIG. 3C), and a protective layer 6 is further laminated onto the film, if desired, to thereby yield a color filter (FIG. 3D). The invented color filter having satisfactory characteristics can be economically produced by the aforementioned method.

Figure 4:
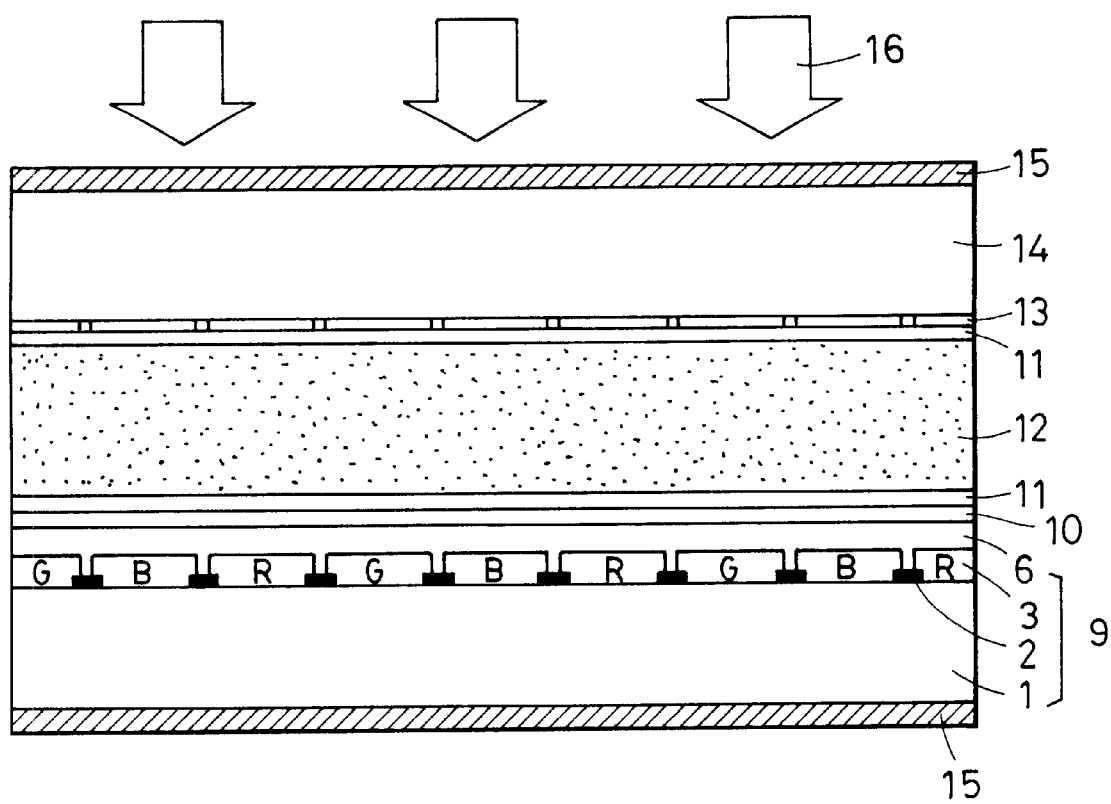
FIG. 4 is a schematic sectional view showing an embodiment of a liquid crystal panel including the invented color filter.

FIG. 4 is a sectional view of an embodiment of a TFT color liquid crystal panel in accordance with the present invention, in which the above-described invented color filter is assembled.

The TFT color liquid crystal device includes a substrate 1 provided with a color filter 9, a substrate 14 provided with a TFT matrix, these two substrates being affixed to each other, and a liquid crystal composition 12 encapsulated into the gap between the two substrates. The substrates may be glass. A TFT (not shown) matrix and a transparent pixel electrode matrix 13 are formed on the inner surface of one substrate. A color filter 9 is formed on the inner surface of the other substrate 1 so as to face the pixel electrode matrix 13, and a transparent counter or common electrode 10 is formed thereon over the entire surface. Further, alignment films 11 and 11 are formed on the inner surfaces of the two substrates and subjected to rubbing in order to achieve unidirectional alignment of the liquid crystal molecules. The outer surfaces of the substrates include polarizing plates 15 and 15, and the liquid crystal composition is encapsulated into the gap (about 2 to 5 $\mu$m) between the two substrates. The back light 16 used comprises fluorescent light and scattered light (both not shown), and the liquid crystal composition acts as a light shutter, which changes transmittance of the back light 16, for displaying images.

EXAMPLES

The present invention will now be illustrated in further detail with reference to several examples and comparative examples below, which are not intended to limit the scope of the invention.

Examples 1 to 8

A curable resin composition containing a copolymer of N-methylolacrylamide and hydroxyethyl methacrylate (50:50, by weight) was applied to a glass substrate to a thickness of 1.2 $\mu$m by spin coating, which substrate had a chromium black matrix having openings 60 to 150 $\mu$m in size. The applied resin composition was then subjected to pre-baking at 120° C. for 20 minutes to yield an ink receiving layer.

Eight types of green (G) inks were prepared in accordance with the following Formulation 1 (G) by using, as coloring materials for G ink, an individual azopyridone dye 1 composed of each of the compounds 6 to 10 represented by the chemical formulae 6 to 10, and an individual phthalocyanine dye 2 composed of each of the compounds 11 and 12 represented by the chemical formulae 11 and 12. Formulation Examples A1 to A8 in Table 1 indicate the combinations of the two dyes.

| Ink Formulation 1 (G) | |
|---|---|
| Dye 1 | 3 wt % |
| Dye 2 | 3 wt % |
| Ethylene glycol monobutyl ether (b.p. 170° C.) | 39 wt % |
| Ethyl alcohol (b.p. 78° C.) | 6 wt % |
| Water | 49 wt % |

TABLE 1

Coloring Materials According to Formulation 1 (G)

| Formulation Example | Dye 1 | Dye 2 |
|---|---|---|
| A1 | Compound 6 | Compound 11 |
| A2 | Compound 7 | Compound 11 |
| A3 | Compound 8 | Compound 11 |
| A4 | Compound 9 | Compound 11 |
| A5 | Compound 10 | Compound 11 |
| A6 | Compound 6 | Compound 12 |

TABLE 1-continued

| Coloring Materials According to Formulation 1 (G) | | |
|---|---|---|
| Formulation Example | Dye 1 | Dye 2 |
| A7 | Compound 7 | Compound 12 |
| A8 | Compound 8 | Compound 12 |

The R ink and B ink used in combination with the G ink were prepared in accordance with the following Formulation 1 (R, B) using C. I. Direct Red 80 and C. I. Acid Blue 83, respectively, as the dye.

| Ink Formulation 1 (R, B) | |
|---|---|
| Dye | 5.7 wt % |
| Ethylene glycol monobutyl ether (b.p. 170° C.) | 39 wt % |
| Ethyl alcohol (b.p. 78° C.) | 6 wt % |
| Water | 49.3 wt % |

Using an ink jet printer, the above-prepared G ink, R ink and B ink were applied to portions of the ink receiving layer on the substrate, on which a pixel of an individual color should be formed, to form a colored matrix pattern of RGB colors. The ink receiving layer was then baked at 230° C. for 50 minutes to cure it, and it was dried. A two-pack thermosetting acrylic resin material (produced by JSR under the trade name of "SS-7625") was applied to the dried ink receiving layer by spin coating to yield a film 1 μm thick. The formed film was then heat-treated at 240° C. for 20 minutes to form a protective layer to thereby yield a color filter for liquid crystals according to Example 1.

The above procedure was repeated to yield color filters for liquid crystals according to Examples 2 to 8, except that each of the G inks of Formulation Examples A2 to A8 was used instead of the G ink of Formulation Example A1. The characteristics of the color filters for liquid crystals according to Examples 1 to 8 and ink jet discharge stability of the G inks prepared according to Examples 1 to 8 were then evaluated. The results are shown in Table 2.

<Evaluation Methods>

Evaluation 1: Transparency of Colored Portions

A series of liquid crystal panels was prepared using the above-prepared color filters according to Examples 1 to 8, and the transparency of G patterned areas was visually inspected and was evaluated according to the following criteria.

A Highly transparent
B: Rather poorly transparent
C: Poorly transparent, and opaque Evaluation 2: Heat Resistance Each of the above-prepared color filters according to Examples 1 to 8 was allowed to stand in an oven at 250° C. for 1 hour, and the degree of change in color (fading) in G patterned portions was calculated as ΔE (metric hue difference) specified by International Commission on Illumination (CIE) and was evaluated according to the following criteria.

A: ΔE of 3 or less (the change in color (fading) is hardly recognized.)
B: ΔE of more than 3 and equal to or less than 10 (the change in color (fading) is slightly recognized, but it is inconsequential in practical use.)
C: ΔE of more than 10 (the change in color (fading) is clearly recognized.)

Evaluation 3: Light Resistance

Each of the above-prepared color filters was irradiated with xenon light for 50 hours using a Fade Meter Ci 35 produced by Atlas Co., Ltd., and the degree of change in color (fading) in G patterned portions was calculated as ΔE specified by CIE, and was evaluated according to the following criteria.

A: ΔE of 3 or less
B: ΔE of more than 3 and equal to or less than 10
C: ΔE of more than 10

Evaluation 4: Discharge Stability

Each of the G inks according to Examples 1 to 8 was mounted on an ink jet printer (produced by Canon Kabushiki Kaisha under the trade name of "BJ-10V") and a character pattern was printed on 300 sheets of A4 paper, and the 300th sheet of printed A4 paper was visually inspected to thereby evaluate the discharge stability according to the following criteria.

A: No problem
B: Some faint fading
C: Little discharge of ink

TABLE 2

| | | Evaluations of Examples 1 to 8 | | | |
|---|---|---|---|---|---|
| | Dye | Evaluation 1 | Evaluation 2 | Evaluation 3 | Evaluation 4 |
| Example 1 | A1 | A | B | A | A |
| Example 2 | A2 | A | A | A | A |
| Example 3 | A3 | A | B | A | A |
| Example 4 | A4 | A | A | A | A |
| Example 5 | A5 | A | A | A | A |
| Example 6 | A6 | A | B | A | A |
| Example 7 | A7 | A | A | A | A |
| Example 8 | A8 | A | B | A | A |

Comparative Examples 1 to 6

Color filters for liquid crystals according to Comparative Examples 1 to 6 were prepared in the same manner as in Examples 1 to 8, except that each of the dyes according to Formulation Examples A9 to A14 in Table 3 was used instead of the dyes in the G inks in Table 1. The characteristics of the prepared color filters for liquid crystals and the G inks used therein were evaluated in the same manner as in Examples 1 to 8. The results are shown in Table 4.

TABLE 3

| Coloring Materials in Formulation 1 (G) | | |
|---|---|---|
| Formulation Example | Dye 1 | Dye 2 |
| A9 | Acid Yellow 23 | Compound 11 |
| A10 | Acid Yellow 42 | Compound 11 |
| A11 | Acid Yellow 76 | Compound 11 |
| A12 | Acid Yellow 23 | Compound 12 |
| A13 | Acid Yellow 42 | Compound 12 |
| A14 | Acid Yellow 76 | Compound 12 |

TABLE 4

Evaluations of Comparative Examples 1 to 6

| | Dye | Evaluation 1 | Evaluation 2 | Evaluation 3 | Evaluation 4 |
|---|---|---|---|---|---|
| Comp. Ex. 1 | A9 | C | B | C | A |
| Comp. Ex. 2 | A10 | C | A | C | A |
| Comp. Ex. 3 | A11 | C | A | C | A |
| Comp. Ex. 4 | A12 | C | B | C | A |
| Comp. Ex. 5 | A13 | C | A | C | A |
| Comp. Ex. 6 | A14 | C | A | C | A |

Examples 9 to 16

A black pigment resist (produced by Fuji-Hunt Electronics Technology Co., Ltd. under the trade name of "CK-S171B") was applied to a glass substrate by spin coating, and the applied film was then exposed, developed and heat-treated to thereby form a black matrix 1.0 μm thick on the substrate.

R, G and B inks were discharged on openings by an ink jet printer. The three discharged inks were cured and converted into a film by heat treatment at 230° C. for 30 minutes to form a color filter for liquid crystals. Recording inks containing a film-forming component and prepared in the following manner were employed as the inks. Specifically, the ink formulations were as in the Ink Formulation 2 (G) and Ink Formulation 2 (R, B) below using the following coloring materials.

Coloring material of R ink: C. I. Direct Red 80
Coloring material of B ink: C. I. Acid Blue 83
Coloring material of G ink: Dye according to
Formulation Examples A1 to A8 shown in Table 1

| Ink Formulation 2 (G) Dye | |
|---|---|
| Dye 1 | 3.0 wt % |
| Dye 2 | 3.0 wt % |
| Acrylic copolymer having the following weight composition | 3.0 wt % |
| N-methylolacrylamide | 20 parts |
| N,N-dimethylaminoethyl methacrylate | 10 parts |
| Methyl methacrylate | 25 parts |
| 2-Hydroxyethyl methacrylate | 40 parts |
| Acrylic acid | 5 parts |
| Ethylene glycol monobutyl ether (b.p. 170° C.) | 36.0 wt % |
| Ethyl alcohol (b.p. 78° C.) | 6.0 wt % |
| Water | 49.0 wt % |
| Ink Formulation 2 (R, B) | |
| Dye | 5.7 wt % |
| Acrylic copolymer having the following weight composition | 3.0 wt % |
| N-methylolacrylamide | 20 parts |
| N,N-dimethylaminoethyl methacrylate | 10 parts |
| Methyl methacrylate | 25 parts |
| 2-Hydroxyethyl methacrylate | 40 parts |
| Acrylic acid | 5 parts |
| Ethylene glycol monobutyl ether (b.p. 170° C.) | 36.0 wt % |
| Ethyl alcohol (b.p. 78° C.) | 6.0 wt % |
| Water | 49.3 wt % |

<Evaluation Methods>
Evaluation 1: Transparency of Colored Portions

A series of liquid crystal panels was prepared using the above-prepared color filters according to Examples 9 to 16, and the transparency of G patterned areas was visually inspected and was evaluated according to the following criteria. The results are shown in Table 5.

A: Highly transparent
B: Rather poorly transparent
C: Poorly transparent, and opaque Evaluation 2: Heat Resistance Each of the above-prepared color filters according to Examples 9 to 16 was allowed to stand in an oven at 250° C. for 1 hour, and the degree of change in color (fading) in G patterned portions was calculated as ΔE (metric hue difference) specified by CIE and was evaluated according to the following criteria. The results are shown in Table 5.

A: ΔE of 3 or less
B: ΔE of more than 3 and equal to or less than 10
C: ΔE of more than 10

Evaluation 3: Light Resistance

Each of the above-prepared color filters according to Examples 9 to 16 was irradiated with xenon light for 50 hours using a Fade Meter Ci 35 produced by Atlas Co., Ltd., and the degree of change in color (fading) in G patterned portions was calculated as ΔE specified by CIE and was evaluated according to the following criteria. The results are shown in Table 5.

A: ΔE of 3 or less
B: ΔE of more than 3 and equal to or less than 10
C: ΔE of more than 10

Evaluation 4: Discharge Stability

Each of the G inks according to Examples 9 to 16 was mounted on an ink jet printer (produced by Canon Kabushiki Kaisha under the trade name of "BJ-10V") and a character pattern was printed on 300 sheets of A4 paper, and the 300th sheet of printed A4 paper was visually inspected to thereby evaluate the discharge stability according to the following criteria. The results are shown in Table 5.

A: No problem
B: Some faint fading
C: Little discharge of ink

TABLE 5

Evaluations of Examples 9 to 16

| | Dye | Evaluation 1 | Evaluation 2 | Evaluation 3 | Evaluation 4 |
|---|---|---|---|---|---|
| Example 9 | A1 | A | B | A | A |
| Example 10 | A2 | A | A | A | A |
| Example 11 | A3 | A | B | A | A |
| Example 12 | A4 | A | A | A | A |
| Example 13 | A5 | A | A | A | A |
| Example 14 | A6 | A | B | A | A |
| Example 15 | A7 | A | A | A | A |
| Example 16 | A8 | A | B | A | A |

Comparative Examples 7 to 12

Color filters for liquid crystals according to Comparative Examples 7 to 12 were prepared in the same manner as in Examples 9 to 16, except that each of the dyes according to Formulation Examples A9 to A14 in Table 3 was used instead of the dyes according to Formulation Examples A1 to A8 in Table 1. The characteristics of the prepared color filters for liquid crystals and the G inks used therein were evaluated in the same manner as in Examples 9 to 16. The results are shown in Table 6.

TABLE 6

Evaluations of Comparative Examples 7 to 12

| | Dye | Evaluation 1 | Evaluation 2 | Evaluation 3 | Evaluation 4 |
|---|---|---|---|---|---|
| Comp. Ex. 7 | A9 | C | B | C | A |
| Comp. Ex. 8 | A10 | C | A | C | A |
| Comp. Ex. 9 | A11 | C | A | C | A |
| Comp. Ex. 10 | A12 | C | B | C | A |
| Comp. Ex. 11 | A13 | C | A | C | A |
| Comp. Ex. 12 | A14 | C | A | C | A |

Examples 17 to 24

Yellow (Y) inks or green (G) inks were prepared according to the following Formulation 3 using dyes according to Formulation Examples B1 to B8 in Table 7. Each of the prepared inks was loaded in an ink jet printer (produced by Canon Kabushiki Kaisha under the trade name of "BJC-620") and a filled-in pattern was then printed on an overhead projector (OHP) film (produced by Canon Kabushiki Kaisha under the trade name of "CF-102"). The characteristics of the recorded images were evaluated. In the following formulations, B1 to B5 were Y inks and B6 to B8 were G inks.

| Ink Formulation 3 | |
|---|---|
| B1 to B5 (Y) | |
| Dye 1 | 3.0 wt % |
| Ethylene glycol (b.p. 197.9° C.) | 20.0 wt % |
| Ethyl alcohol (b.p. 78° C.) | 4.0 wt % |
| Water | 73.0 wt % |
| B6 to B8 (G) | |
| Dye 1 | 3.0 wt % |
| Dye 2 | 2.0 wt % |
| Ethylene glycol (b.p. 197.9° C.) | 20.0 wt % |
| Ethylalcohol (b.p. 78° C.) | 4.0 wt % |
| Water | 71.0 wt % |

TABLE 7

Coloring Materials in Formulation 3 (Y) or (G)

| Formulation Example | Dye 1 | Dye 2 |
|---|---|---|
| B1 | Compound 6 | none |
| B2 | Compound 7 | none |
| B3 | Compound 8 | none |
| B4 | Compound 9 | none |
| B5 | Compound 10 | none |
| B6 | Compound 6 | Compound 11 |
| B7 | Compound 7 | Compound 11 |
| B8 | Compound 8 | Compound 11 |

<Evaluation Methods>
Evaluation 1: OHP Suitability

A recorded image was projected on a screen using an OHP, and the projected image was visually inspected and was evaluated according to the following criteria. The results are shown in Table 8.

A: A high-contrast, clear and easy-to-read projected image having a brightly recorded image with a high optical density was obtained B: A projected image had a slightly low density and appeared dark C: A projected image had a remarkably dark recorded area and a low optical density, and lacked definition Evaluation 2: Solid-fill Uniformity The solid-fill uniformity of a projected image was evaluated according to the following criteria, and the results are shown in Table 8. In the criteria, the term "beading" means a phenomenon that, when an ink has fluidity before being fixed on the ink receiving layer, a dot formed by the ink irregularly shifts in a facial direction of the surface of the ink receiving layer and aggregates with an adjacent dot to form a new dot aggregate to thereby yield an irregular density in the recorded image.

A: No beading and no irregularity

B: Some beading

C: Clear beading and remarkable irregularity

Evaluation 3: Image Stability

A series of images was recorded onto an individual recording medium using the printer. Each of the recorded images was stored at 35° C. at 90% relative humidity (RH) for 7 days, and the image stability of the recorded image was evaluated according to the following criteria by comparing the stored image with an image before storage. The results are shown in Table 8.

A: No change in image

B: Deterioration in image with ink spreading, ink blotches, or letter-widening

TABLE 8

Evaluations on Examples 17 to 24

| | Dye | Evaluation 1 | Evaluation 2 | Evaluation 3 |
|---|---|---|---|---|
| Example 17 | B1 | A | A | A |
| Example 18 | B2 | A | A | A |
| Example 19 | B3 | A | A | A |
| Example 20 | B4 | A | A | A |
| Example 21 | B5 | A | A | A |
| Example 22 | B6 | A | A | A |
| Example 23 | B7 | A | A | A |
| Example 24 | B8 | A | A | A |

Comparative Examples 13 to 18

A solid-fill pattern was printed on an OHP film in the same manner as in Examples 17 to 24, except that the coloring materials according to Formulation Examples B9 to B11 and B12 to B14 indicated in Table 9 were used as the Y and G inks used in Examples 17 to 24, respectively. The characteristics of the recorded images were evaluated in the same manner as in Examples 17 to 24, and the results are shown in Table 10.

TABLE 9

Coloring Materials in Formulation 3 (G)

| Formulation Example | Dye 1 | Dye 2 |
|---|---|---|
| B9 | Acid Yellow 23 | none |
| B10 | Acid Yellow 42 | none |
| B11 | Acid Yellow 76 | none |
| B12 | Acid Yellow 23 | Compound 11 |
| B13 | Acid Yellow 42 | Compound 11 |
| B14 | Acid Yellow 76 | Compound 11 |

TABLE 10

Evaluations on Comparative Examples 13 to 18

|  | Dye | Evaluation 1 | Evaluation 2 | Evaluation 3 |
|---|---|---|---|---|
| Comp. Ex. 13 | B9 | A | A | B |
| Comp. Ex. 14 | B10 | B | A | B |
| Comp. Ex. 15 | B11 | A | A | B |
| Comp. Ex. 16 | B12 | A | A | B |
| Comp. Ex. 17 | B13 | B | A | B |
| Comp. Ex. 18 | B14 | A | A | B |

As is described above, the present invention with the use of a specific water-soluble azopyridone dye provides a recording ink which satisfies, to a high degree, all the requirements of transparency, decreased blurring, and adhesion to substrates of the resulting pixels, as well as the requirement of good discharge property as an ink. The use of the invented ink permits the economical production of color filters for liquid crystals, which are satisfactory in heat resistance, washing resistance, and adhesion to substrates and in which colored portions of green pixels exhibit less blurring and are high in color contrast and color purity. The use of the color filters permits the production of satisfactory liquid crystal panels.

In addition, the present invention provides recording inks which are effective as inks for office or industrial printers and provides yellow inks which are particularly suitable for the formation of yellow images observed through a transmitted light.

While the present invention has been described with reference to what are presently considered to be the preferred embodiments, it is to be understood that the invention is not limited to the disclosed embodiments. On the contrary, the invention is intended to cover various modifications and equivalent arrangements included within the sprit and scope of the appended claims. The scope of the following claims is to be accorded the broadest interpretation so as to encompass all such modifications and equivalent structures and functions.

What is claimed is:

1. A recording ink comprising:

a water-soluble azopyridone dye represented by the following formula (1);

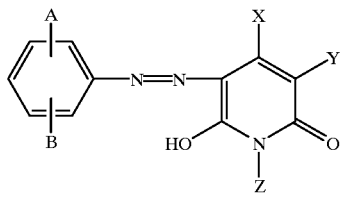

(1)

wherein each of A and B is independently a hydrogen atom, a halogen atom, a hydroxyl group, a cyano group, a nitro group, an amino group, a phosphono group, a sulfonic acid group, a sulfamide group, a carboxyl group, a trifluoromethyl group, a straight-chain or branched alkyl group, a straight-chain or branched alkoxy group, an aryl group which may have at least one substituent, or a salt of these substances; X is a straight-chain or branched alkyl group, a hydrogen atom, a carboxyl group, or a trifluoromethyl group; Y is a hydrogen atom, a cyano group, a carbamoyl group, a sulfonic acid group, a methylsulfonyl group, or a salt of these substances; and Z is a straight-chain or branched alkyl group, and wherein said water-soluble azopyridone dye has at least one sulfonic acid group or a salt thereof in its structure;

a phthalocyanine dye represented by the following formula (2):

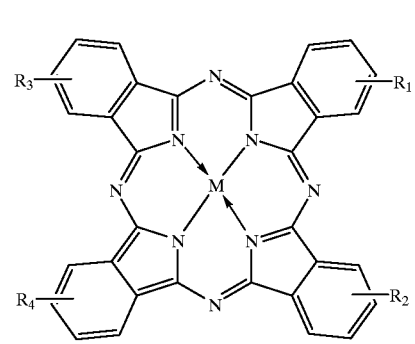

(2)

wherein each of $R_1$, $R_2$, $R_3$, and $R_4$ is independently a hydrogen atom, a sulfonic acid group, a sulfamide group, a carboxyl group, a halogen atom, a hydroxyl group, a cyano group, a nitro group, an amino group, a phosphono group, a trifluoromethyl group, a straight-chain or branched alkyl group, a straight-chain or branched alkoxy group, an aryl group which may have a substituent, a phenoxy group which may have a substituent, a thiophenoxy group which may have a substituent, a phenyl group which may have a substituent, or a salt of these substances; M represents two hydrogen atoms, two Na atoms, two Li atoms, two metals, or a trivalent or tetravalent metal derivative; and wherein said phthalocyanine dye has at least two sulfonic acid groups or salts thereof in its structure; and a water-soluble organic solvent.

2. A recording ink according to claim 1, wherein said water-soluble azopyridone dye and said phthalocyanine dye are contained in a weight ratio of 3:1 to 1:3 and said ink produces a green color.

3. A recording ink according to claim 1, wherein said water-soluble organic solvent comprises a water-soluble organic solvent having a boiling point of 120° C. or more, which is present at 10% by weight or more of the ink.

4. A recording ink according to claim 1, wherein X in formula (1) is a trifluoromethyl group.

5. A recording ink according to claim 4, wherein Y in formula (1) is a sulfonic acid group or a methylsulfonyl group.

6. A recording ink according to claim 1, further comprising a film-forming component and wherein said ink is convertible into a film by application of at least one of heat and light.

7. A recording ink according to claim 6, wherein said film-forming component is at least one component selected from the group consisting of acrylic monomers, polymers having an acrylic monomeric unit, vinyl monomers, and polymers having a vinyl monomeric unit.

8. A recording ink according to claim 7, wherein the acrylic monomeric unit is represented by the following formula (5):

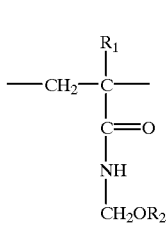
(5)

wherein $R_1$ is a hydrogen atom or a methyl group; and $R_2$ is a hydrogen atom or an alkyl group.

9. A recording ink according to claim 1, wherein the ink is an ink for ink jet recording.

10. A method for ink jet recording, comprising the step of performing ink jet recording by using the recording ink according to claim 9.

11. A method for producing a color filter, comprising the step of forming a plurality of colored pixels by using a recording ink comprising:

a water-soluble azopyridone dye represented by the following formula (1); and a water-soluble organic solvent:

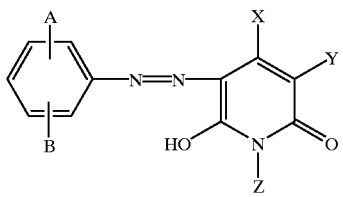
(1)

wherein each of A and B is independently a hydrogen atom, a halogen atom, a hydroxyl group, a cyano group, a nitro group, an amino group, a phosphono group, a sulfonic acid group, a sulfamide group, a carboxyl group, a trifluoromethyl group, a straight-chain or branched alkyl group, a straight-chain or branched alkoxy group, an aryl group which may have at least one substituent, or a salt of these substances; X is a straight-chain or branched alkyl group, a hydrogen atom, a carboxyl group, or a trifluoromethyl group; Y is a hydrogen atom, a cyano group, a carbamoyl group, a sulfonic acid group, a methylsulfonyl group, or a salt of these substances; and Z is a straight-chain or branched alkyl group, and wherein said water-soluble azopyridone dye has at least one sulfonic acid group or a salt thereof in its structure.

12. A method according to claim 11, wherein said step of forming colored pixels comprises a step of applying the ink to a substrate with an ink jet recording system.

13. A method for producing a color filter by using a recording ink comprising:

a water-soluble azopyridone dye represented by the following formula (1); and a water-soluble organic solvent:

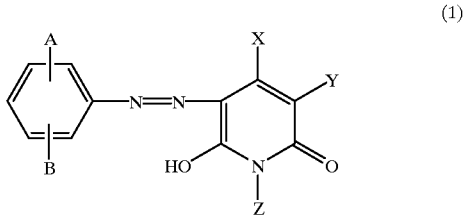
(1)

wherein each of A and B is independently a hydrogen atom, a halogen atom, a hydroxyl group, a cyano group, a nitro group, an amino group, a phosphono group, a sulfonic acid group, a sulfamide group, a carboxyl group, a trifluoromethyl group, a straight-chain or branched alkyl group, a straight-chain or branched alkoxy group, an aryl group which may have at least one substituent, or a salt of these substances; X is a straight-chain or branched alkyl group, a hydrogen atom, a carboxyl group, or a trifluoromethyl group; Y is a hydrogen atom, a cyano group, a carbamoyl group, a sulfonic acid group, a methylsulfonyl group, or a salt of these substances; and Z is a straight-chain or branched alkyl group, and wherein said water-soluble azopyridone dye has at least one sulfonic acid group or a salt thereof in its structure, said method comprising the steps of:

applying said ink to an ink receiving layer with an ink jet system, said ink receiving layer comprising a polymer having an acrylic monomeric unit; and curing said ink receiving layer.

14. A method according to claim 13, wherein said acrylic monomeric unit is represented by the following formula (5):

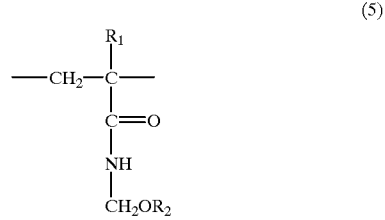
(5)

wherein $R_1$ is a hydrogen atom or a methyl group; and $R_2$ is a hydrogen atom or an alkyl group.

15. A method according to claim 13, wherein said ink receiving layer comprises a photopolymerization initiator.

16. A method according to claim 13, wherein said ink receiving layer comprises non-colored portions, said method further comprising a step of partially curing the non-colored portions of the ink receiving layer by light irradiation or by light irradiation and heat treatment in combination prior to application of the ink to thereby reduce ink absorbency of the non-colored portions of the ink receiving layer.

17. A method for producing a color filter, said method comprising the steps of:

applying a recording ink to a substrate; and converting said applied ink on the substrate into a film by application of at least one of heat and light to thereby form colored pixels, wherein said recording ink comprises:

a water-soluble azopyridone dye represented by the following formula (1):

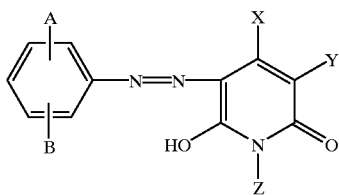

(1)

wherein each of A and B is independently a hydrogen atom, a halogen atom, a hydroxyl group, a cyano group, a nitro group, an amino group, a phosphono group, a sulfonic acid group, a sulfamide group, a carboxyl group, a trifluoromethyl group, a straight-chain or branched alkyl group, a straight-chain or branched alkoxy group, an aryl group which may have at least one substituent, or a salt of these substances; X is a straight-chain or branched alkyl group, a hydrogen atom, a carboxyl group, or a trifluoromethyl group; Y is a hydrogen atom, a cyano group, a carbamoyl group, a sulfonic acid group, a methylsulfonyl group, or a salt of these substances; and Z is a straight-chain or branched alkyl group, and wherein said water-soluble azopyridone dye has at least one sulfonic acid group or a salt thereof in its structure;

a water-soluble organic solvent; and a film-forming component.

18. A method according to claim 17, wherein said recording ink is applied with an ink jet system in said step of applying the recording ink.

19. A method according to claim 17, wherein said substrate has a wall for preventing ink color-mixing.

20. A method according to claim 18, wherein said substrate has a wall for preventing ink color-mixing.

21. A color filter produced by the method of claim 11.

22. A color filter produced by the method of claim 13.

23. A color filter produced by the method of claim 17.

24. A color filter containing a green pixel, said green pixel comprising a water-soluble azopyridone dye represented by the following formula (1) and a phthalocyanine dye represented by the following formula (2):

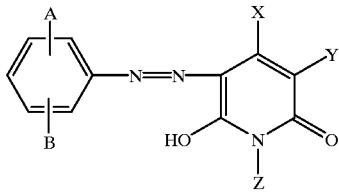

(1)

wherein each of A and B is independently a hydrogen atom, a halogen atom, a hydroxyl group, a cyano group, a nitro group, an amino group, a phosphono group, a sulfonic acid group, a sulfamide group, a carboxyl group, a trifluoromethyl group, a straight-chain or branched alkyl group, a straight-chain or branched alkoxy group, an aryl group which may have at least one substituent, or a salt of these substances; X is a straight-chain or branched alkyl group, a hydrogen atom, a carboxyl group, or a trifluoromethyl group; Y is a hydrogen atom, a cyano group, a carbamoyl group, a sulfonic acid group, a methylsulfonyl group, or a salt of these substances; and Z is a straight-chain or branched alkyl group, and wherein said water-soluble azopyridone dye has at least one sulfonic acid group or a salt thereof in its structure;

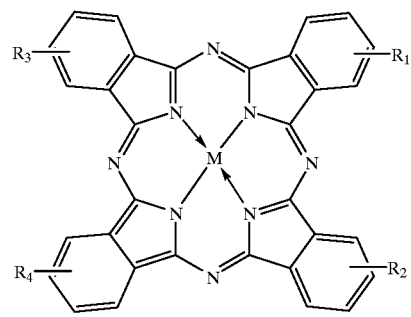

(2)

wherein each of $R_1$, $R_2$, $R_3$, and $R_4$ is independently a hydrogen atom, a sulfonic acid group, a sulfamide group, a carboxyl group, a halogen atom, a hydroxyl group, a cyano group, a nitro group, an amino group, a phosphono group, a trifluoromethyl group, a straight-chain or branched alkyl group, a straight-chain or branched alkoxy group, an aryl group which may have a substituent, a phenoxy group which may have a substituent, a thiophenoxy group which may have a substituent, a phenyl group which may have a substituent, or a salt of these substances; M represents two hydrogen atoms, two Na atoms, two Li atoms, two metals, or a trivalent or tetravalent metal derivative, and wherein said phthalocyanine dye has at least two sulfonic acid groups or salts thereof in its structure.

25. A color filter according to claim 24, wherein said water-soluble azopyridone dye and said phthalocyanine dye are contained in a weight ratio of 3:1 to 1:3.

26. A color filter according to claim 24, wherein X in formula (1) is a trifluoromethyl group.

27. A color filter according to claim 26, wherein Y in formula (1) is a sulfonic acid group or a methylsulfonyl group.

28. A method for producing a liquid crystal display panel, comprising the step of using the color filter according to any one of claims 24 to 27.

29. A liquid crystal display panel comprising the color filter according to any one of claims 24 to 27.

* * * * *